(12) United States Patent
Kakizaki et al.

(10) Patent No.: US 10,596,874 B2
(45) Date of Patent: Mar. 24, 2020

(54) VEHICLE AIR CONDITIONER

(71) Applicant: HONDA MOTOR CO., LTD., Minato-Ku, Tokyo (JP)

(72) Inventors: Shinji Kakizaki, Shioya-gun (JP); Choji Sakuma, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 14/769,236

(22) PCT Filed: Mar. 10, 2014

(86) PCT No.: PCT/JP2014/056151
§ 371 (c)(1),
(2) Date: Aug. 20, 2015

(87) PCT Pub. No.: WO2014/156585
PCT Pub. Date: Oct. 2, 2014

(65) Prior Publication Data
US 2016/0001628 A1 Jan. 7, 2016

(30) Foreign Application Priority Data
Mar. 29, 2013 (JP) .................................. 2013-074870

(51) Int. Cl.
*B60H 1/00* (2006.01)
(52) U.S. Cl.
CPC ..... *B60H 1/00021* (2013.01); *B60H 1/00835* (2013.01); *B60H 1/00899* (2013.01);
(Continued)

(58) Field of Classification Search
CPC ...... B60H 1/00021; B60H 2001/00178; B60H 1/0005; B60H 1/00207;
(Continued)

(56) References Cited

U.S. PATENT DOCUMENTS 3,225,563 A * 12/1965 Braun ................... F24F 13/224
62/277
3,555,848 A * 1/1971 Johnson .................. F25B 1/005
62/457.9
(Continued)

FOREIGN PATENT DOCUMENTS

| CN | 1252364 A | 5/2000 |
| CN | 201646305 U | 11/2010 |

(Continued)

OTHER PUBLICATIONS

English translation of JPH05221229A.*
(Continued)

*Primary Examiner* — Marc E Norman
*Assistant Examiner* — Schyler S Sanks
(74) *Attorney, Agent, or Firm* — Carrier, Blackman and Associates, P.C.; William D. Blackman; Joseph P. Carrier

(57) ABSTRACT

A vehicle air conditioner includes: a condenser that internally circulates a high-temperature and high-pressure refrigerant which is discharged from a compressor and that heats air passing around the condenser; an evaporator that internally circulates a low-temperature and low-pressure refrigerant and that absorbs heat from the air passing around the evaporator; and a switching portion that switches flows of air in response to a heating time, a cooling time, and a dehumidifying-heating time of a vehicle. Also, the switching portion causes the air passing around the condenser to flow into a vehicle compartment during the heating time of the vehicle, causes the air passing around the evaporator to flow into the vehicle compartment during the cooling time of the vehicle and causes the air sequentially passing through the evaporator and the condenser to flow into the vehicle compartment during the dehumidifying-heating time of the vehicle.

15 Claims, 6 Drawing Sheets

(52) U.S. Cl.
CPC ............. *B60H 2001/00135* (2013.01); *B60H 2001/00178* (2013.01)

(58) Field of Classification Search
CPC ........... B60H 2001/00214; B60H 2001/00228; B60H 2001/2287; B60H 1/00899; F25B 31/006

See application file for complete search history.

(56) References Cited

U.S. PATENT DOCUMENTS

| | | | |
|---|---|---|---|
| 5,533,357 A * | 7/1996 | Voorhis | F24F 1/027 62/277 |
| 6,092,383 A | 7/2000 | Mertens | |
| 8,839,894 B2 | 9/2014 | Yokoyama et al. | |
| 2002/0017383 A1 | 2/2002 | Vincent | |
| 2012/0060550 A1 * | 3/2012 | Mann | F25B 39/00 62/513 |

FOREIGN PATENT DOCUMENTS

| | | | |
|---|---|---|---|
| CN | 102770293 A | | 11/2012 |
| EP | 0 284 097 A2 | | 9/1988 |
| JP | S60255522 A | * | 12/1985 |
| JP | S63-241818 A | | 10/1988 |
| JP | H04166412 A | * | 6/1992 |
| JP | H05-155236 A | | 6/1993 |
| JP | 05221229 A | | 8/1993 |
| JP | H05221229 A | * | 8/1993 |
| JP | 2002-331819 A | | 11/2002 |

OTHER PUBLICATIONS

English translation of JPH04166412A.*
English Translation of JPS60255522A.*
Office Action dated Jun. 14, 2016 for corresponding Chinese Patent Application No. 201480008380.1.
Notice of Allowance dated Oct. 4, 2016 to corresponding Japanese Application No. 2015-508247.
Office Action issued in corresponding DE Patent Application 112014001746.9 dated Feb. 3, 2017.
Office Action issued in the corresponding Chinese Patent Application 201480008380.1, with the English translation thereof, and dated Mar. 2, 2017.

* cited by examiner

VEHICLE AIR CONDITIONER

TECHNICAL FIELD

The present invention relates to a vehicle air conditioner.

Priority is claimed on Japanese Patent Application No. 2013-074870, filed Mar. 29, 2013, the content of which is incorporated herein by reference.

BACKGROUND ART

In the related art, in a vehicle air conditioner using a cooler cycle, a configuration is known which includes a heater core for circulating cooling water heated by an engine and an evaporator for circulating a refrigerant (for example, refer to PTL 1). In this type of vehicle air conditioner, air circulating in a ventilation duct is heated by the heater core during heating and is cooled by the evaporator during cooling.

In contrast, a vehicle such as an electric vehicle which does not include an engine serving as a vehicle driving source cannot utilize the cooling water of the engine during the heating. Therefore, instead of the above-described cooler cycle, the vehicle employs a vehicle air conditioner utilizing a heat pump cycle. In this type of vehicle air conditioner, flows of the refrigerant are switched so as to perform a switching operation between a cooling mode and a heating mode.

Here, with regard to a vehicle air conditioner in the related art which utilizes the heat pump cycle, the flows of the refrigerant in the cooling mode and the heating mode will be briefly described. FIGS. 5A and 5B are configuration diagrams of the vehicle air conditioner in the related art. FIG. 5A illustrates the heating mode, and FIG. 5B illustrates the cooling mode.

As illustrated in FIG. 5A, in the heating mode, the high-temperature and high-pressure refrigerant which is discharged from a compressor 101 radiates heat in a vehicle compartment condenser 102. Thereafter, the refrigerant is expanded by an expansion valve 104, and is brought into an atomized state with two phases of gas and liquid (rich in a liquid phase). Then, the refrigerant in a vehicle exterior heat exchanger 105 absorbs heat from the vehicle exterior atmosphere. The refrigerant in the atomized state with two phases of gas and liquid (rich in a liquid phase) passes through a heating electromagnetic valve 106 and a junction pipe 107, and flows into a gas-liquid separator 108. Within the refrigerant separated into gas and liquid in the gas-liquid separator 108, the refrigerant in a gas phase is sucked into the compressor 101 again.

Then, air circulated in a ventilation duct 103 by a blower 109 passes through the vehicle compartment condenser 102. In this manner, the air is supplied into a vehicle compartment for the purpose of heating (refer to an arrow in the drawing).

In contrast, in the cooling mode, the high-temperature and high-pressure refrigerant which is discharged from the compressor 101 passes through the vehicle compartment condenser 102 and the expansion valve 104, and heat thereof is radiated to the vehicle exterior atmosphere in the vehicle exterior heat exchanger 105. Thereafter, the refrigerant passes through a check valve 111 and a branch pipe 112, and flows into a cooling electronic expansion valve 113.

Then, the refrigerant is expanded by the cooling electronic expansion valve 113, and is brought into an atomized state with two phases of gas and liquid (rich in a liquid phase). Next, the heat of the refrigerant is absorbed in the evaporator 110, thereby cooling the air inside the ventilation duct 103. Thereafter, the refrigerant with two phases (rich in a gas phase) of gas and liquid which passes through the evaporator 110 passes through the junction pipe 107, and flows into the gas-liquid separator 108. In the refrigerant separated into gas and liquid in the gas-liquid separator 108, the refrigerant in a gas phase is sucked into the compressor 101 again.

Accordingly, the air circulated in the ventilation duct 103 by the blower 109 is cooled by heat absorption in the evaporator 110. Thereafter, the air is circulated by bypassing the vehicle compartment condenser 102. In this manner, the air is supplied into the vehicle compartment for the purpose of cooling.

PRIOR ART DOCUMENTS

Patent Documents

[PTL 1] Japanese Unexamined Patent Application, First Publication No. S63-241818

DISCLOSURE OF INVENTION

Problem to be Solved by Invention

However, the vehicle air conditioner utilizing the heat pump cycle has more accessories and parts such as various pipe valves and joints as compared to the vehicle air conditioner utilizing the above-described cooler cycle, since a flow of the refrigerant varies depending on the heating mode and the cooling mode. Consequently, there are the following problems due to an increase in the number of components.

First, air conditioning performance becomes poor due to heat transfer from the above-described accessories and parts and an increase in flow path resistance.

Second, increased accessories and parts cause an increase in equipment cost, and degrade production efficiency.

Third, the increased accessories and parts increase a refrigerant filling amount, thereby increasing the equipment cost and also increasing the equipment weight.

Fourth, the increased accessories and parts cause a possibility that the refrigerant may leak out from a connection portion of the various pipes, valves, and joints. Therefore, system reliability of the air conditioner is lowered.

Therefore, the present invention is made in view of the above-described circumstances, and an object thereof is to provide a vehicle air conditioner which can realize lower cost, improved production efficiency, reduction in weight, a simplified configuration, guaranteed system reliability, and high air-conditioning performance.

Means for Solving the Invention

In order to achieve the above-described object, a vehicle air conditioner according to an aspect of the present invention includes a condenser that internally circulates a high-temperature and high-pressure refrigerant which is discharged from a compressor, and that heats air passing around the condenser, an evaporator that internally circulates a low-temperature and low-pressure refrigerant, and that absorbs heat from air passing around the evaporator, and a switching portion that switches flows of the air in response to a heating time, a cooling time, and a dehumidifying-heating time of a vehicle. The switching portion causes the air passing around the condenser to flow into a vehicle compartment during the heating time of the vehicle, causes the air passing around the evaporator to flow into the vehicle compartment during the cooling time of the vehicle, and causes the air sequentially passing through the evaporator and the condenser to flow into the vehicle compartment during the dehumidifying-heating time of the vehicle.

The condenser and the evaporator may be arranged so as to be close to each other.

The above-described vehicle air conditioner may further include a connection portion that connects the condenser and the evaporator to each other, that expands the refrigerant discharged from the condenser and that discharges the refrigerant of low-temperature and low-pressure to the evaporator. The condenser and the evaporator may be integrated with each other via the connection portion.

The condenser and the evaporator may be arranged at a position close to a dashboard of the vehicle.

Effects of the Invention

According to the above-described aspect of the present invention, during a heating time of a vehicle, heat exchange takes place between a condenser and air when the air passes around the condenser, thereby heating the air. As a result, warm air can be supplied into a vehicle compartment.

In addition, during a cooling time of the vehicle, heat is absorbed from the air by an evaporator when the air passes around the evaporator, thereby cooling the air. As a result, cool air can be supplied into the vehicle compartment.

During a dehumidifying-heating time of the vehicle, the heat is absorbed by the evaporator when the air passes through the evaporator, thereby cooling the air down to a dew point and dehumidifying the air. Thereafter, the dehumidified air passes through the condenser. In this manner, similarly to the above-described heating time, the air becomes warm air and is supplied into the vehicle compartment.

In this way, according to the above-described aspect of the present invention, cooling, heating, and dehumidifying-heating can be switched from each other simply by switching flows of the air inside the vehicle air conditioner. Therefore, as compared to a configuration in which various modes are switched from each other by switching flows of a refrigerant as in a heat pump cycle in the related art, it is possible to reduce the number of components.

As a result, it is possible to realize lower cost, improved production efficiency, reduction in weight, and a simplified configuration.

In addition, fewer components can prevent an increase in a heat transfer area and flow path resistance. Accordingly, it is possible to improve air-conditioning performance.

Furthermore, the refrigerant can be prevented from leaking out from a connection portion of each component. Accordingly, it is possible to improve system reliability.

In addition, as is in the above-described aspect of the present invention, if the condenser and the evaporator are arranged at the position close to each other, it is possible to shorten the length of a pipe for connecting the condenser and the evaporator to each other, for example. This can further reduce the number of components.

In addition, as in the above-described aspect of the present invention, if the condenser and the evaporator are integrated with each other via a connection portion for expanding the refrigerant, it is possible to minimize the length of a refrigerant flow path between the condenser and the evaporator. This can reduce an installation space, and can further reduce the number of components.

In addition, as in the above-described aspect of the present invention, if the condenser and the evaporator are arranged in the vicinity of a dashboard, the air can be more effectively circulated between the vehicle compartment, a motor compartment, and an engine room via the condenser and the evaporator.

EMBODIMENTS FOR CARRYING OUT THE INVENTION

Figure 1:
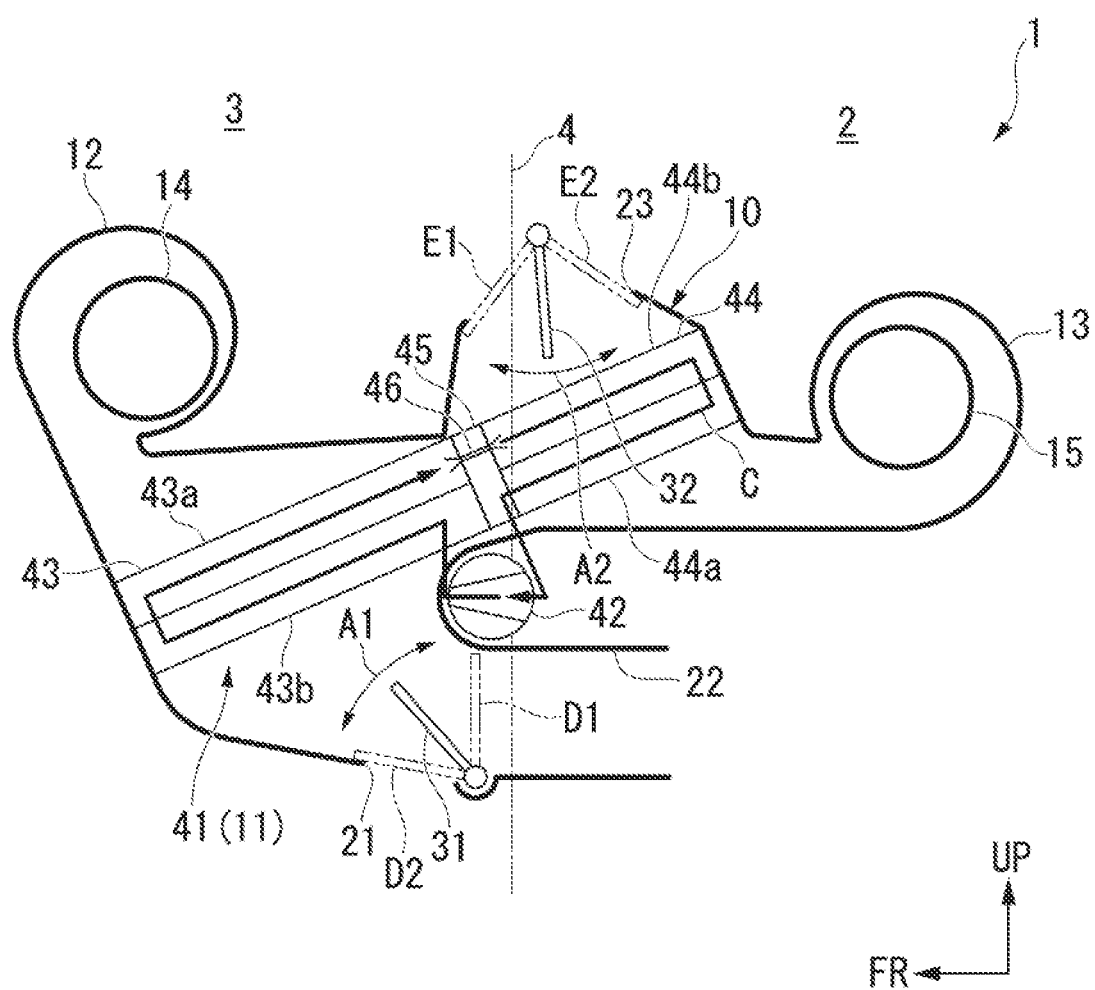
FIG. 1 is a configuration diagram (side view) of a vehicle air conditioner.

Next, an embodiment according to the present invention will be described with reference to the drawings. In the following description, longitudinal, vertical, and lateral directions are the same as the directions in a vehicle, unless otherwise described. In addition, in the drawings used for the following description, an arrow FR indicates a front section of the vehicle, and an arrow UP indicates an upper section of the vehicle.

[Vehicle Air Conditioner]

FIG. 1 is a configuration diagram (side view) of a vehicle air conditioner.

A vehicle air conditioner 1 according to the present embodiment illustrated in FIG. 1 is mounted on an electric vehicle which does not include an engine (internal combustion engine) as a vehicle driving source. Specifically, the vehicle air conditioner 1 mainly includes a casing 10 and a heat pump cycle 11 through which a refrigerant can be circulated.

The casing 10 has a long box shape in the longitudinal direction, for example, and is arranged so as to penetrate a dashboard 4 which partitions a vehicle compartment 2 and a motor compartment 3 at the center portion in the longitudinal direction. That is, the casing 10 is arranged in a state where a front portion protrudes to the motor compartment 3 side and a rear portion protrudes to the vehicle compartment 2 side from the dashboard 4, respectively.

A pair of inlet ducts (first inlet duct 12 and second inlet duct 13) protruding upward are formed in both longitudinal end portions of the casing 10.

The first inlet duct 12 is located at a front end portion of the casing 10 and has a first air inlet (not illustrated) which opens toward one side in the vehicle width direction. In addition, a first blower 14 is accommodated in the first inlet duct 12. The first blower 14 causes internal air or external air (hereinafter, the internal air and the external air are collectively referred to as air, in some cases) of the vehicle compartment which is taken into the casing 10 from the first air inlet to blow into the casing 10.

The second inlet duct 13 is located at a rear end portion of the casing 10 and has a second air inlet (not illustrated) which opens toward the other side in the vehicle width direction. In addition, a second blower 15 is accommodated in the second inlet duct 13. The second blower 15 causes air which is taken into the casing 10 from the second air inlet to blow into the casing 10.

Multiple blowing ports 21 to 23 which blow the air circulating inside the casing 10 outward from the casing 10 are formed in the casing 10. Specifically, the casing 10 has a downward blowing port 21 which opens downward, a rearward blowing port 22 which opens rearward, and an upward blowing port 23 which opens upward.

The downward blowing port 21 can communicate with the inside of the motor compartment 3 on a lower surface of the casing 10.

The rearward blowing port 22 can communicate with the inside of the vehicle compartment 2 in the rear from the downward blowing port 22 in the casing 10.

In addition, a first damper (switcher) 31 for switching to open any one of the blowing ports 21 and 22 from the downward blowing port 21 and the rearward blowing port 22 is disposed in the casing 10. Specifically, the first damper 31 is pivotally movable by using driving device (not illustrated) between a cooling position D1 where the downward blowing port 21 is open and the rearward blowing port 22 is closed and a heating position D2 where the rearward blowing port 22 is open and the downward blowing port 21 is closed (refer to an arrow A1 in FIG. 1).

That is, when the first damper 31 is located at the cooling position D1, the air blowing from the downward blowing port 21 is discharged into the motor compartment 3. In contrast, when the first damper 31 is located at the heating position D2, the air blowing from the rearward blowing port 22 is supplied into the vehicle compartment 2 (feet, upper body, defroster (DEF), and the like) through a supply port disposed in the vehicle compartment 2, as warm air for heating (or for dehumidifying-heating).

The upward blowing port 23 is formed so as to extend across the dashboard 4 in the longitudinal direction on the upper surface of the casing 10, and can communicate with the inside of the motor compartment 3 and the inside of the vehicle compartment 2, respectively.

Then, a second damper (switching portion) 32 which can switch an opening direction of the upward blowing port 23 over to the side provided with the motor compartment 3 or the side provided with the vehicle compartment 2 is disposed in the casing 10. Specifically, the second damper 32 is pivotally movable by using driving means (not illustrated) between a cooling position E1 where the upward blowing port 23 communicates with the side provided with the vehicle compartment 2 and the side provided with the motor compartment 3 is closed and a heating position E2 where the upward blowing port 23 communicates with the side provided with the motor compartment 3 and the side provided with the vehicle compartment 2 is closed (refer to an arrow A2 in FIG. 1).

That is, when the second damper 32 is located at the cooling position E1, the air blowing from the upward blowing port 23 is supplied into the vehicle compartment 2 through a supply port (not illustrated), as cool air for cooling. In contrast, when the second damper 32 is located at the heating position E2, the air blowing from the upward blowing port 23 is discharged into the motor compartment 3. A guide path (not illustrated) which guides the air discharged into the motor compartment 3 from the upward blowing port 23 to the first inlet duct 12 in a dehumidifying-heating mode (to be described later) may be connected to the upward blowing port 23.

For example, the heat pump cycle 11 includes a heat exchange unit 41 and a compressor 42. A refrigerant can be circulated between the heat exchange unit 41 and the compressor 42.

The heat exchange unit 41 is arranged in a state of lying in the vicinity of the dashboard 4 inside the casing 10, and partitions the inside of the casing 10 in the longitudinal direction.

Specifically, the heat exchange unit 41 is configured so that the condenser 43 and the evaporator 44 are integrated with each other via the connection portion 45 such that a side surface of the condenser and a side surface of the evaporator are disposed to face each other via the connection portion. In this case, within the heat exchange unit 41, the condenser 43 is arranged on a front side inside the casing 10, and the evaporator 44 is arranged on a rear side inside the casing 10 and above the condenser 43.

The condenser 43 can radiate heat by using an internally circulating a high-temperature and high-pressure refrigerant. For example, the condenser 43 performs heat exchange with the air passing around the condenser 43 inside the casing 10. That is, the condenser 43 can heat the air passing around the condenser 43. The condenser 43 is arranged so as to separate the side provided with the motor compartment 3 inside the casing 10 into the first inlet duct 12 and the downward blowing port 21.

The evaporator 44 performs heat exchange between the internally circulating refrigerant of low-temperature and low-pressure and the air inside the casing 10. Specifically, for example, the evaporator 44 cools the air passing around the evaporator 44 by absorbing the heat when the refrigerant evaporates. The evaporator 44 is arranged so as to separate into the second inlet duct 13 and the upward blowing port 23 in the side provided with the vehicle compartment 2 inside the casing 10.

The connection portion 45 includes an expansion valve 46 which connects an outlet side flow path 43a of the condenser 43 and an inlet side flow path 44b of the evaporator 44 to each other. The expansion valve 46 expands the refrigerant discharged from the condenser 43, and discharges the refrigerant of low-temperature and low-pressure in an atomized state with two phases of gas and liquid to the inlet side flow path 44b of the evaporator 44. Instead of the expansion valve 46, a diffuser may be employed.

The compressor 42 connects an outlet side flow path 44a of the evaporator 44 and an inlet side flow path 43b of the condenser 43 to each other. The compressor 42 sucks the refrigerant which is brought into a gas phase after circulating in the evaporator 44, compresses the refrigerant, and discharges the high-temperature and high-pressure refrigerant to the condenser 43.

[Operation Method of Vehicle Air Conditioner]

Next, an operation method of the above-described vehicle air conditioner 1 will be described. The vehicle air conditioner 1 according to the present embodiment can switch a cooling mode, a heating mode, and a dehumidifying-heating mode from each other by switching flows of the air inside the casing 10.

First, a flow of a refrigerant (refer to an arrow C in the drawing) in the heat pump cycle 11 will be described.

Figure 2A:
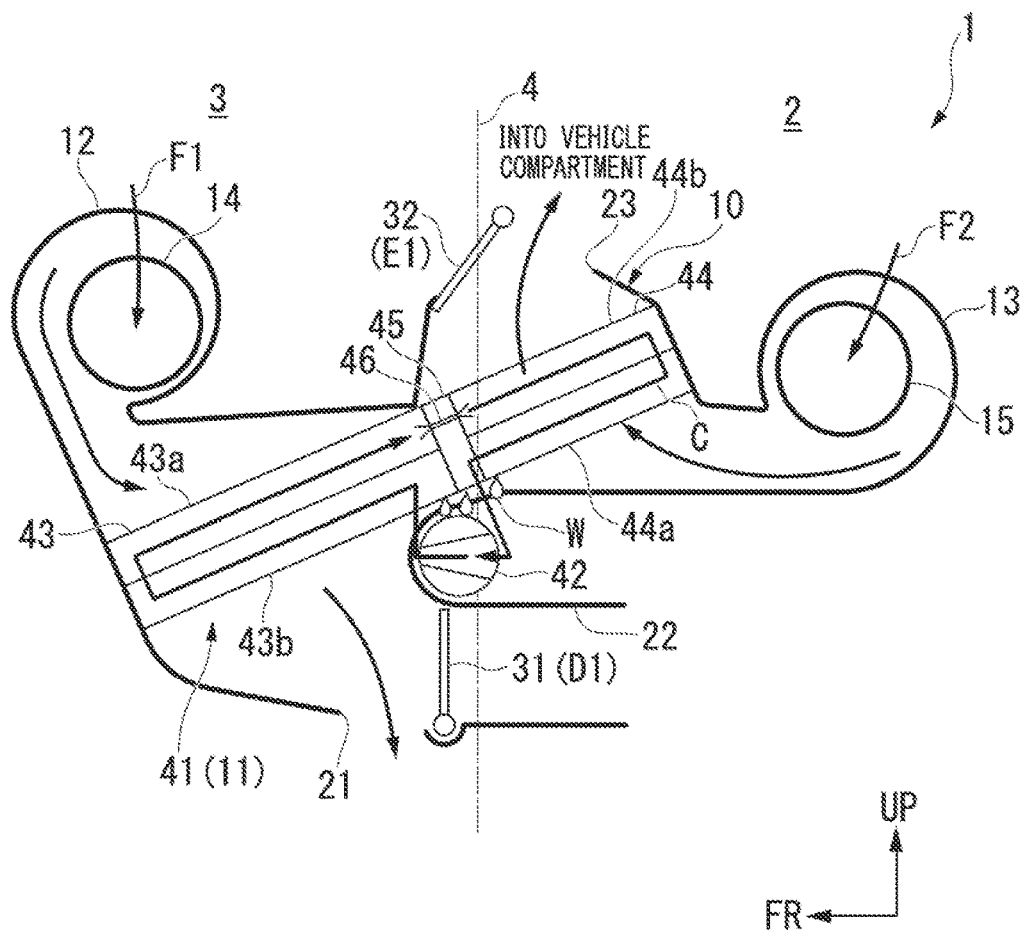
FIG. 2A is an explanatory diagram for illustrating a cooling mode, and is a configuration diagram corresponding to FIG. 1.
Figure 2B:
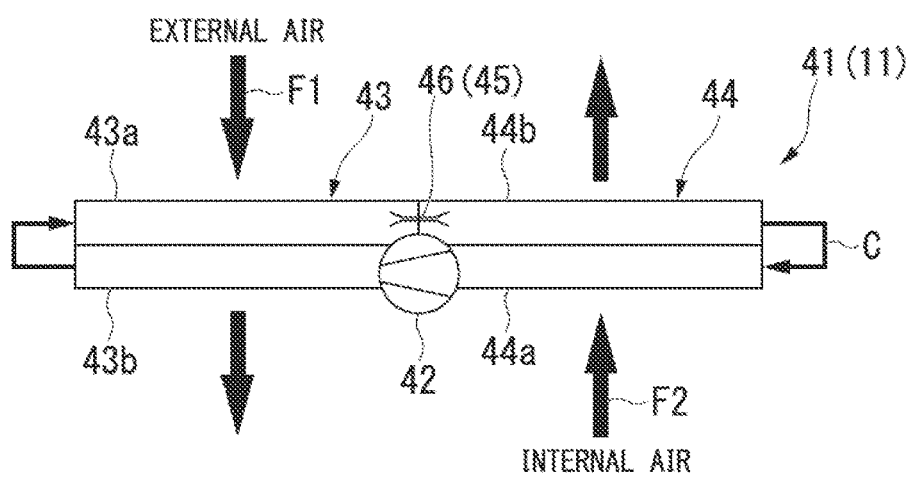
FIG. 2B is an explanatory diagram for illustrating the cooling mode and is a diagram illustrating a flow of air and a flow of a refrigerant.

FIGS. 2A and 2B are explanatory diagrams for illustrating the cooling mode. FIG. 2A is a configuration diagram corresponding to FIG. 1, and FIG. 2B is a diagram for illustrating a flow of air and a flow of the refrigerant.

As illustrated in FIGS. 2A and 2B, the high-temperature and high-pressure refrigerant (gas phase) which is discharged from the compressor 42 is supplied to the inlet side flow path 43b of the condenser 43. The refrigerant supplied to the inlet side flow path 43b of the condenser 43 is caused to circulate while radiating heat in the condenser 43, and is brought into a liquid phase. Thereafter, the refrigerant brought into the liquid phase flows into the expansion valve 46 via the outlet side flow path 43a.

Then, the refrigerant is expanded by the expansion valve 46, is brought into an atomized state with two phases of gas and liquid, and is supplied to the inlet side flow path 44b of the evaporator 44. Thereafter, the refrigerant supplied to the inlet side flow path 44b of the evaporator 44 is caused to circulate while the heat is absorbed by the evaporator 44, and is brought into a gas phase. The refrigerant brought into the gas phase flows out from the outlet side flow path 44a and is sucked into the compressor 42 again.

The air inside the casing 10 is cooled down to a dew point by the evaporator 44. In this manner, the air is condensed to become condensed water W, and adheres to the evaporator 44 and the outer peripheral surface of the connection portion 45. Then, the condensed water W is transferred to the condenser 43 and the compressor 42. Accordingly, a superheated portion (overheated portion) of the condenser 43 and an inverter of the compressor 42 are cooled.

Next, a flow of the air in each mode will be described.

<Cooling Mode>

In the cooling mode, as illustrated in FIG. 2A, the first damper 31 and the second damper 32 are first set to be located at the cooling positions D1 and E1. That is, the rearward blowing port 22 is closed by the first damper 31, and the motor compartment 3 side within the upward blowing port 23 is closed by the second damper 32.

In this state, if the blowers 14 and 15 are driven, air F1 and air F2 respectively flow into the first inlet duct 12 and the second inlet duct 13 through each air inlet. The air taken from the inlet ducts 12 and 13 may be internal air or external air of the vehicle compartment. In FIG. 2B, the external air flows into the first inlet duct 12, and the internal air flows into the second inlet duct 13.

Out of the air F1 and the air F2 which flow into the ducts 12 and 13, the air F1 flowing into the first inlet duct 12 is subjected to heat exchange with the condenser 43 when the air F1 passes through the condenser 43 inside the casing 10. Thereafter, the air F1 is discharged from the downward blowing port 21. Then, the air F1 discharged from the downward blowing port 21 is discharged outward from the vehicle through the motor compartment 3. That is, the air F1 is used in radiating the heat in the condenser 43, and then is discharged from the downward blowing port 21.

In contrast, the air F2 flowing into the second inlet duct 13 is cooled by heat absorption in the evaporator 44 when the air F2 passes through the evaporator 44 inside the casing 10, and then is discharged from the upward blowing port 23. The air F2 discharged from the upward blowing port 23 is supplied into the vehicle compartment 2 through a supply port (not illustrated) as cool air. A temperature of the air supplied into the vehicle compartment 2 from the supply port can be adjusted by changing rotating speed of the compressor 42.

<Heating Mode>

Figure 3A:
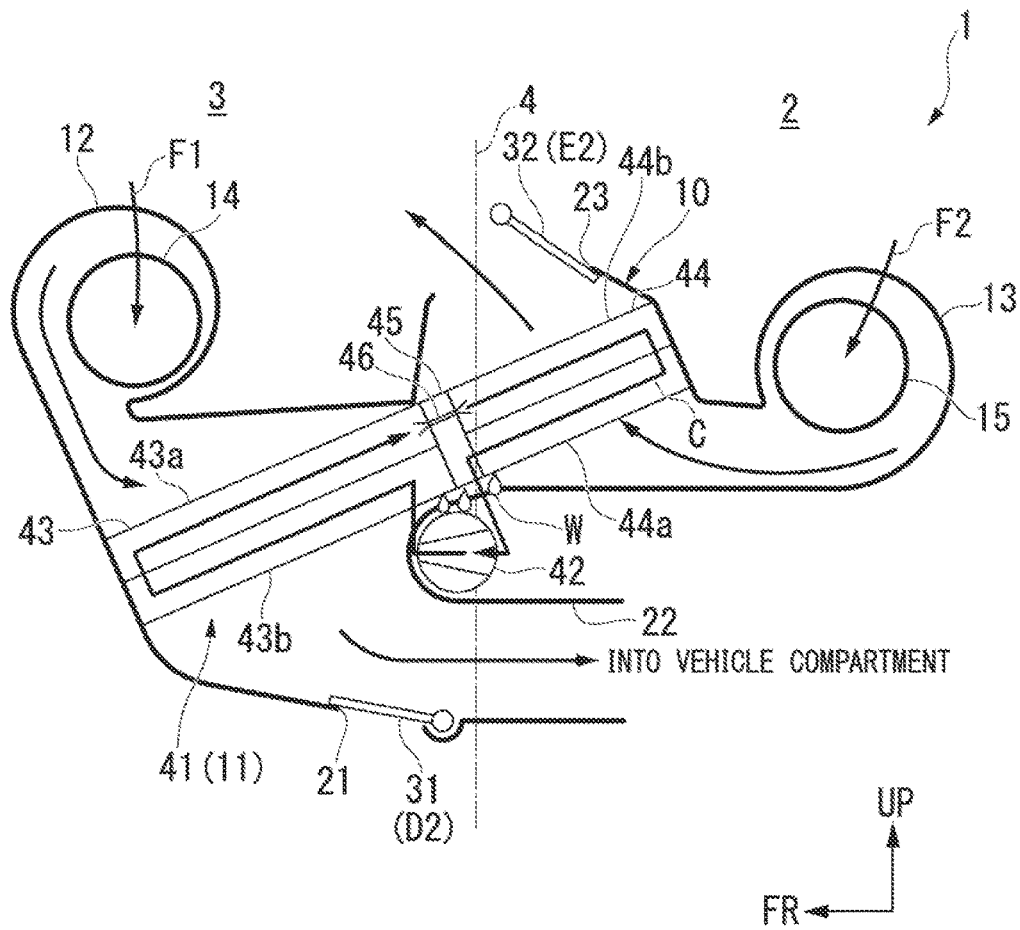
FIG. 3A is an explanatory diagram for illustrating a heating mode and is a configuration diagram corresponding to FIG. 1.
Figure 3B:
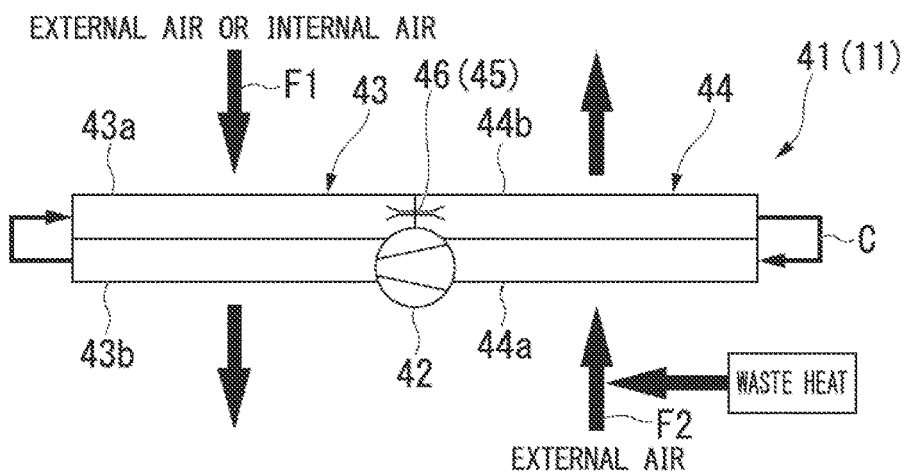
FIG. 3B is an explanatory diagram for illustrating the heating mode and is a diagram illustrating a flow of the air and a flow of the refrigerant.

FIGS. 3A and 3B are explanatory diagrams for illustrating the heating mode. FIG. 3A is a configuration diagram corresponding to FIG. 1, and FIG. 3B is a diagram for illustrating a flow of the air and a flow of the refrigerant.

In the heating mode, as illustrated in FIG. 3A, the first damper 31 and the second damper 32 are first set to be located at the heating positions D2 and E2. That is, the downward blowing port 21 is closed by the first damper 31, and the vehicle compartment 2 side within the upward blowing port 23 is closed by the second damper 32.

In the heating mode, out of the air F1 and the air F2 which flow into the ducts 12 and 13, the air F1 flowing into the first inlet duct 12 is heated by heat exchange with the condenser 43 when the air F1 passes through the condenser 43 inside the casing 10. Thereafter, the air F1 is discharged from the rearward blowing port 23. Then, the air F1 discharged from the rearward blowing port 23 is supplied into the vehicle compartment 2 through a supply port (not illustrated) as warm air. The air taken from the first inlet duct 12 may be the internal air or the external air of the vehicle compartment. However, it is preferable to take the external air for defrosting, and to take the internal air for heating a person's feet or an upper body.

In contrast, the air F2 flowing into the second inlet duct 13 is cooled by heat absorption in the evaporator 44 when the air F2 passes through the evaporator 44 inside the casing 10, and then is discharged from the upward blowing port 23. The air discharged from the upward blowing port 23 is discharged outward from the vehicle by way of the inside of the motor compartment 3.

The air F2 taken from the second inlet duct 13 may be the internal air or the external air. As illustrated in FIG. 3B, if the air F2 taken into the second inlet duct 13 is the external air, the external air which becomes hot by collecting waste heat inside the motor compartment 3 is caused to pass through the evaporator 44. Therefore, it is possible to improve heat exchange efficiency in the evaporator 44.

<Dehumidifying-Heating Mode>

Figure 4A:
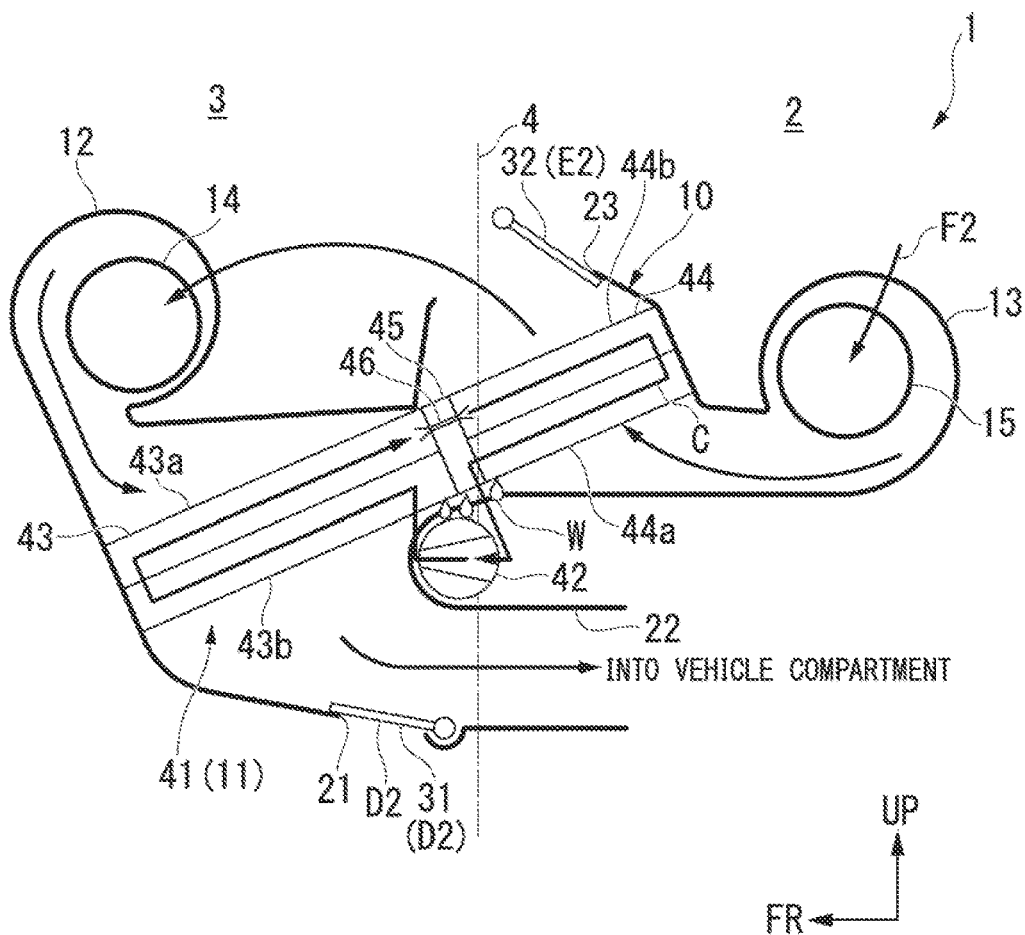
FIG. 4A is an explanatory diagram for illustrating a dehumidifying-heating mode and is a configuration diagram corresponding to FIG. 1.
Figure 4B:
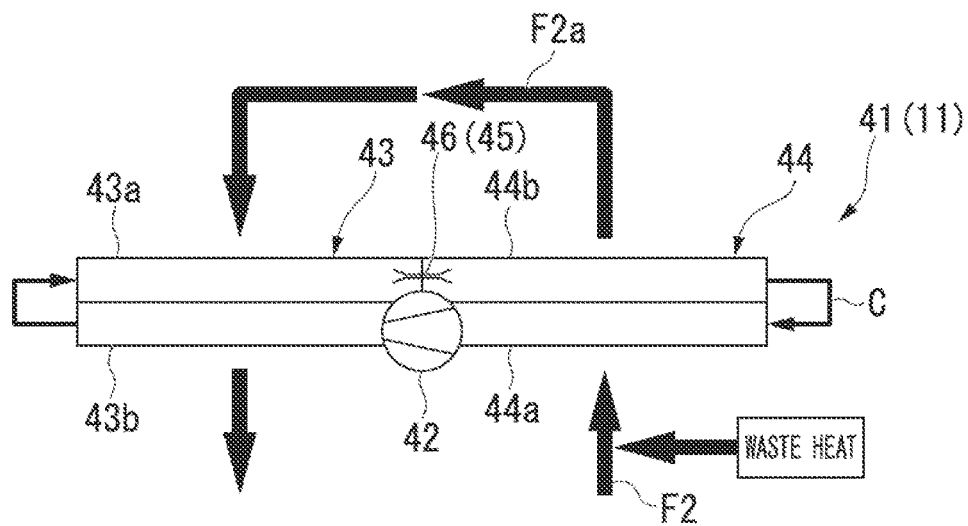
FIG. 4B is an explanatory diagram for illustrating the dehumidifying-heating mode and is a diagram illustrating a flow of the air and a flow of the refrigerant.
Figure 5A:
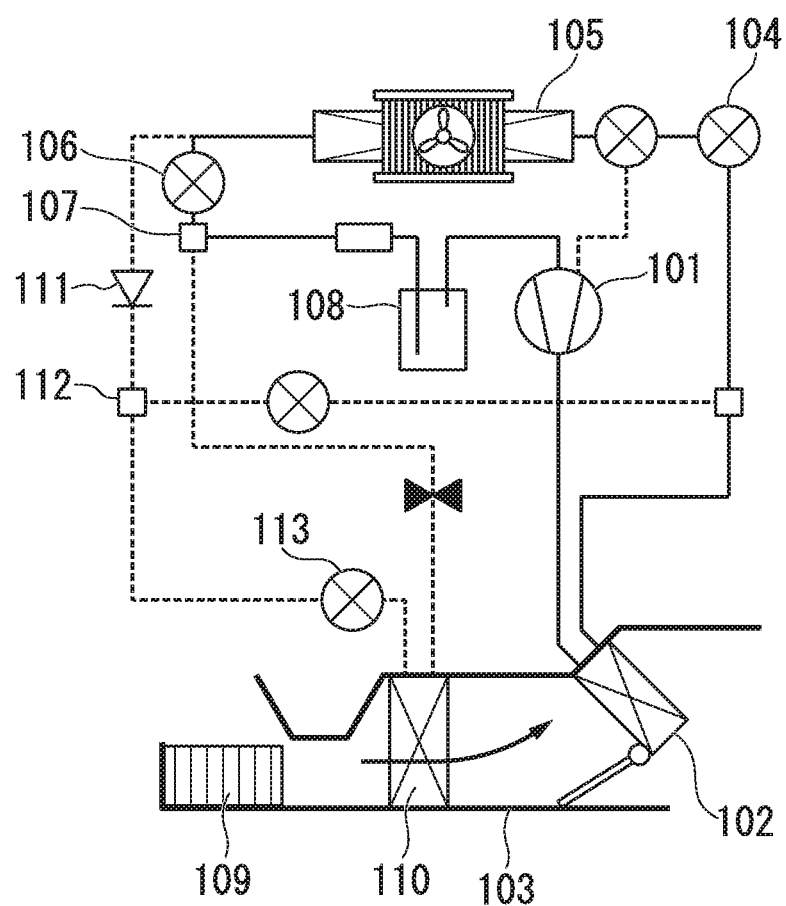
FIG. 5A is a configuration diagram of a vehicle air conditioner in the related art and illustrates a heating mode.
Figure 5B:
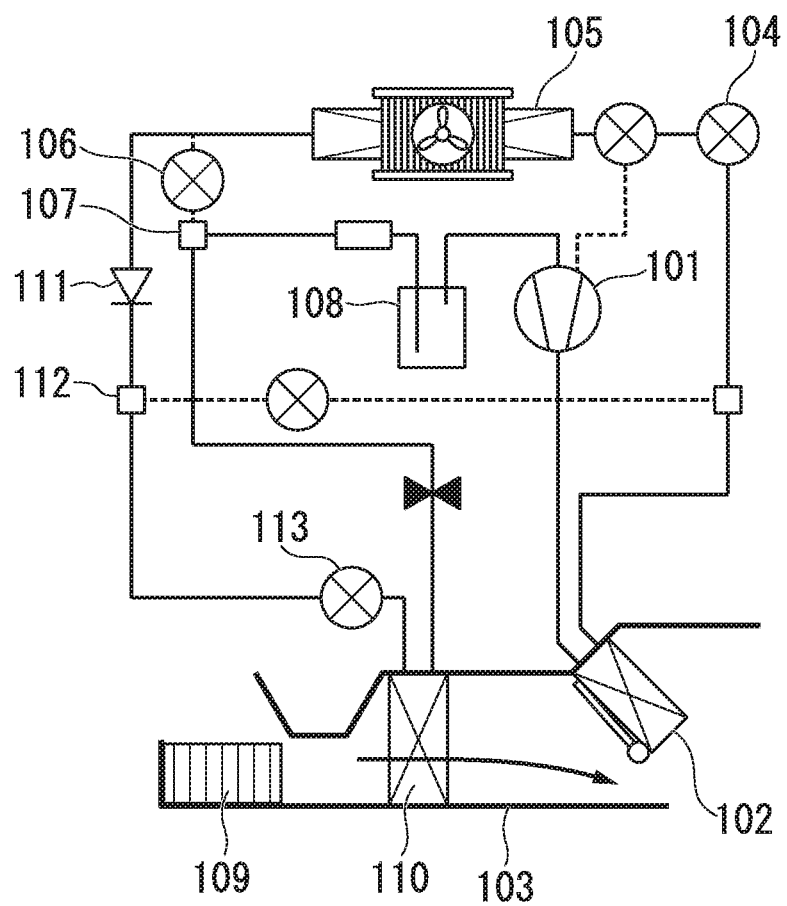
FIG. 5B is a configuration diagram of the vehicle air conditioner in the related art and illustrates a cooling mode.

FIGS. 4A and 4B are explanatory diagrams for illustrating the dehumidifying-heating mode. FIG. 4A is a configuration diagram corresponding to FIG. 1, and FIG. 4B is a diagram for illustrating a flow of the air and a flow of the refrigerant.

In the dehumidifying-heating mode, as illustrated in FIG. 4A, in a state where the first damper 31 and the second damper 32 are first set to be located at the heating positions D2 and E2 similarly to the heating mode, the air F2 is taken from the second inlet duct 13.

The air F2 flowing into the second inlet duct 13 is cooled by heat absorption in the evaporator 44 when the air F2 passes through the evaporator 44 inside the casing 10. At this time, the air F1 passing through the evaporator 44 is cooled down to a dew point, and thus is discharged from the upward blowing port 23 in a dehumidified state.

Air F2a (hereinafter, referred to as dehumidified air 2a) discharged from the upward blowing port 23 flows into the first inlet duct 12 by way of the inside of the motor compartment 3 (for example, the above-described guide path).

The dehumidified air F2a flowing into the first inlet duct 12 is heated by heat exchange with the condenser 43 when the dehumidified air F2a passes through the condenser 43 inside the casing 10. Thereafter, the dehumidified air F2a is discharged from the rearward blowing port 23. Then, the dehumidified air F2a discharged from the rearward blowing port 23 is supplied into the vehicle compartment 2 through a supply port (not illustrated), similarly to the above-described heating mode. In particular, the dehumidified air F2a supplied into the vehicle compartment 2 in the dehumidifying-heating mode is utilized for defrosting. In this manner, it is possible to efficiently remove frost and mist on a vehicle widow.

In the dehumidifying-heating mode, warm air may be supplied to feet or an upper body by introducing the internal air or the external air into the first inlet duct 12. In this case, the internal air or the external air may be supplied for heating, and the dehumidified air F2a may be supplied for defrosting, separately. Alternatively, the internal air or the external air, and the dehumidified air F2a may be distributed for heating and defrosting after being mixed with each other inside the casing 10.

As described above, according to the present embodiment, it is possible to switch the cooling mode, the heating mode, and the dehumidifying-heating mode from each other simply by switching flows of the air inside the casing 10. Therefore, as compared to a configuration in which various modes are switched from one another by switching flows of the refrigerant as in the heat pump cycle in the related art, it is possible to reduce the number of components.

As a result, it is possible to realize lower cost, improved production efficiency, reduction in weight, and a simplified configuration.

In addition, fewer components can prevent an increase in a heat transfer area and flow path resistance. Accordingly, it is possible to improve air-conditioning performance.

Furthermore, the refrigerant can be prevented from leaking out from a connection portion of each component. Accordingly, it is possible to improve system reliability.

In addition, according to the present embodiment, the condenser 43 and the evaporator 44 are arranged close to each other. Accordingly, it is possible to shorten the length of a pipe for connecting the condenser 43 and the evaporator 44 to each other, for example. This can further reduce the number of components.

Furthermore, according to the present embodiment, the condenser 43 and the evaporator 44 are integrated with each other via the connection portion 45 including the expansion valve 46. Accordingly, it is possible to minimize the length of a refrigerant flow path between the condenser and the evaporator. This can reduce an installation space, and can further reduce the number of components.

Furthermore, according to the present embodiment, the condenser 43 and the evaporator 44 are arranged in the vicinity of the dashboard 4. Accordingly, it is possible to more effectively circulate the air between the vehicle compartment 2 and the motor compartment 3 via the condenser 43 and the evaporator 44.

Without being limited to the above-described respective embodiments, the technical scope of the present invention includes various modifications added to the above-described embodiments within a scope not departing from the gist of the present invention. That is, configurations adopted by the above-described embodiments are merely examples and can be appropriately modified.

For example, in the above-described embodiments, an electric vehicle has been described as an example of a vehicle which does not include an engine. However, without being limited thereto, a fuel cell vehicle may employ the vehicle air conditioner 1 according to the present invention. In addition, the vehicle including an engine may employ the vehicle air conditioner 1 according to the present embodiment. When the vehicle including an engine employs the vehicle air conditioner 1 according to the present embodiment, a configuration may be adopted in which a heat core which can circulate cooling water of the engine is disposed inside the casing 10.

In addition, in the above-described embodiments, a configuration has been described in which the dehumidified air F2a blowing from the upward blowing port 23 is all caused to flow into the first inlet duct 12 in the dehumidifying-heating mode. However, the embodiments are not limited thereto. For example, a discharge path for discharging the air discharged into the motor compartment 3 outward from the vehicle in the above-described dehumidifying-heating mode, and a guide path for guiding the air discharged into the motor compartment 3 to the first inlet duct 12 in the above-described dehumidifying-heating mode may be disposed in the upward blowing port 23. That is, a configuration may be adopted in which in the dehumidified air F2a discharged from the upward blowing port 23, the dehumidified air is partially discharged outward from the vehicle through the discharge path, and in which the remaining dehumidified air is caused to flow into the first inlet duct 12 through the guide path.

In addition, in the above-described embodiments, a case has been described in which the respective dampers 31 and 32 are set to be located at any one position of the cooling positions D1 and E1 or the heating positions D2 and E2. However, without being limited thereto, a configuration may be adopted in which an opening degree can be adjusted between the cooling positions D1 and E1 and the heating positions D2 and E2.

DESCRIPTION OF THE REFERENCE NUMBER

1 Vehicle Air Conditioner
31 First Damper (Switcher)
32 Second Damper (Switching Portion)
42 Compressor
43 Condenser
44 Evaporator

The invention claimed is:

1. A vehicle air conditioner comprising:
a compressor which compresses refrigerant and discharges the refrigerant at high-temperature and high-pressure;
a condenser that receives the refrigerant discharged from the compressor, which is at high-temperature and high-pressure, and internally circulates the refrigerant so that air passing around the condenser is heated;
an expansion valve that receives the refrigerant discharged from the condenser and expands the refrigerant so that the refrigerant is at low-temperature and low-pressure;
an evaporator that is in fluid communication with the condenser, that receives and internally circulates the refrigerant which is discharged from the expansion valve and is at low-temperature and low-pressure, and that absorbs heat from the air passing around the evaporator;
a connection portion that connects the condenser and the evaporator to each other and has the expansion valve therein; and
a switching portion that switches flows of air in response to a heating mode, a cooling mode, and a dehumidifying-heating mode of a vehicle,
wherein the condenser and the evaporator are arranged next to each other such that a side surface of the condenser and a side surface of the evaporator are disposed to face each other via the connection portion, wherein the condenser and the evaporator are integrated with each other, wherein the switching portion causes the air passing around the condenser to flow into a vehicle passenger compartment during the heating mode of the vehicle, causes the air passing around the evaporator to flow into the vehicle passenger compartment during the cooling mode of the vehicle and causes air passing through the evaporator and the condenser sequentially to flow into the vehicle passenger compartment during the dehumidifying-heating mode of the vehicle, wherein the evaporator is positioned obliquely above the condenser such that water condensed from the air surrounding the evaporator flows down onto the condenser for cooling the condenser, wherein the evaporator, the connection portion and the condenser are arranged in that order and a longitudinal axis of the evaporator, the connection portion and a longitudinal axis of the condenser are arranged in a line along an oblique axis, and wherein the compressor is arranged below the evaporator and adjacent to the connection portion, a distance between the compressor and the connection portion being smaller than a distance between a upper end of the evaporator and the connection portion, and the distance between the compressor and the connection portion being smaller than a distance between a lower end of the condenser and the connection portion.

2. The vehicle air conditioner according to claim 1, wherein the condenser and the evaporator are arranged in a vicinity of a dashboard of the vehicle.

3. The vehicle air conditioner according to claim 1, wherein the switching portion includes a casing which houses the condenser and the evaporator therein.

4. The vehicle air conditioner according to claim 3, wherein the casing has multiple inlets and multiple outlets for the air.

5. The vehicle air conditioner according to claim 3, wherein the casing penetrates a dashboard of the vehicle such that one portion of the casing protrudes toward the vehicle passenger compartment and a second portion of the casing protrudes toward a motor compartment of the vehicle.

6. The vehicle air conditioner according to claim 1, wherein the compressor is arranged under the condenser and the evaporator.

7. The vehicle air conditioner according to claim 6, wherein the water condensed from the air surrounding the evaporator also flows down onto the compressor for cooling the compressor.

8. The vehicle air conditioner according to claim 1, wherein the refrigerant is circulated between the compressor, the condenser and the evaporator.

9. A vehicle air conditioner comprising:

a compressor which compresses refrigerant and discharges the refrigerant at high-temperature and high-pressure;

a condenser that receives the refrigerant discharged from the compressor, which is at high-temperature and high-pressure, and internally circulates the refrigerant so that air passing around the condenser is heated;

an expansion valve that receives the refrigerant discharged from the condenser and expands the refrigerant so that the refrigerant is at low-temperature and low-pressure;

an evaporator that is in fluid communication with the condenser, that receives and internally circulates the refrigerant which is discharged from the expansion valve and is at low-temperature and low-pressure, and that absorbs heat from the air passing around the evaporator;

a connection that connects the condenser and the evaporator to each other and has the expansion valve therein; and a switcher that switches flows of air in response to a heating mode, a cooling mode, and a dehumidifying-heating mode of a vehicle, wherein the condenser and the evaporator are arranged next to each other such that a side surface of the condenser and a side surface of the evaporator are disposed to face each other via the connection, wherein the condenser and the evaporator are integrated with each other, wherein the switcher causes the air passing around the condenser to flow into a vehicle passenger compartment during the heating mode of the vehicle, causes the air passing around the evaporator to flow into the vehicle passenger compartment during the cooling mode of the vehicle and causes air passing through the evaporator and the condenser to flow into the vehicle passenger compartment during the dehumidifying-heating mode of the vehicle, wherein the evaporator is positioned obliquely above the condenser such that water condensed from the air surrounding the evaporator flows down onto the condenser for cooling the condenser, wherein the evaporator, the connection and the condenser are arranged in that order and a longitudinal axis of the evaporator, the connection and a longitudinal axis of the condenser are arranged in a line along an oblique axis, and wherein the compressor is arranged below the evaporator and adjacent to the connection, a distance between the compressor and the connection being smaller than a distance between a upper end of the evaporator and the connection, and the distance between the compressor and the connection being smaller than a distance between a lower end of the condenser and the connection.

10. The vehicle air conditioner according to claim 9, wherein the condenser and the evaporator are arranged in a vicinity of a dashboard of the vehicle.

11. The vehicle air conditioner according to claim 9, wherein the switcher includes a casing which houses the condenser and the evaporator therein.

12. The vehicle air conditioner according to claim 11, wherein the casing has multiple inlets and multiple outlets for the air.

13. The vehicle air conditioner according to claim 9, wherein the compressor is arranged under a boundary between the condenser and the evaporator.

14. The vehicle air conditioner according to claim 13, wherein the water condensed from the air surrounding the evaporator also flows down onto the compressor for cooling the compressor.

15. The vehicle air conditioner according to claim 9, wherein the refrigerant is circulated between the compressor, the condenser and the evaporator.

* * * * *